US009551623B2

(12) United States Patent
Biermann et al.

(10) Patent No.: US 9,551,623 B2
(45) Date of Patent: Jan. 24, 2017

(54) APPARATUS FOR MEASURING AND DETERMINING THE FORCE, THE TORQUE AND THE POWER ON A CRANK, IN PARTICULAR THE PEDAL CRANK OF A BICYCLE

(75) Inventors: Michael Biermann, Darmstadt (DE); Jean-Michel Asfour, Weinheim (DE)

(73) Assignee: Momes GmbH, Heidelberg (DE)

( * ) Notice: Subject to any disclaimer, the term of this patent is extended or adjusted under 35 U.S.C. 154(b) by 1272 days.

(21) Appl. No.: 13/148,197

(22) PCT Filed: Feb. 5, 2010

(86) PCT No.: PCT/DE2010/000121
§ 371 (c)(1),
(2), (4) Date: Mar. 7, 2012

(87) PCT Pub. No.: WO2010/088888
PCT Pub. Date: Aug. 12, 2010

(65) Prior Publication Data
US 2012/0166105 A1   Jun. 28, 2012

(30) Foreign Application Priority Data

Feb. 6, 2009   (DE) .................. 10 2009 001 463

(51) Int. Cl.
*G01L 1/00*   (2006.01)
*G01L 3/24*   (2006.01)
(Continued)

(52) U.S. Cl.
CPC .......... *G01L 3/242* (2013.01); *A63B 24/0062* (2013.01); *B62M 3/08* (2013.01); *B62M 6/50* (2013.01);
(Continued)

(58) Field of Classification Search
CPC .............. A61B 5/22; G06F 17/40; G01L 3/00; G01L 3/242; A63B 24/0062
(Continued)

(56) References Cited

U.S. PATENT DOCUMENTS

| 4,423,630 | A |   | 1/1984 | Morrison |
| 5,044,371 | A | * | 9/1991 | Lautenschlager ...... A63B 24/00 600/520 |

(Continued)

FOREIGN PATENT DOCUMENTS

| CN | 102853958 |    | 1/2013 |
| DE | 294673    | A5 | 10/1991 |

(Continued)

OTHER PUBLICATIONS

R.F. Reiser II; M.L. Peterson and J. P. Broker; "Instrumented bicycle pedals for dynamic measurement of propulsive cycling loads", 2003, Sports Engineering, 6, 41-48.*

(Continued)

*Primary Examiner* — Gregory J Toatley
*Assistant Examiner* — Eman Alkafawi
(74) *Attorney, Agent, or Firm* — Boyle Fredrickson, S.C.

(57) ABSTRACT

The invention relates to an apparatus for measuring and determining the force, the torque and the power on a crank, in particular the pedal crank of a bicycle, comprising an evaluation device, in particular a bicycle computer, and at least one pedal, wherein the force and angular speed variables are converted into electrical signals and supplied to the evaluation device, the pedal comprises a pedal body, a deformation element, a pedal shaft and an angle transmitter, and wherein the force variable is determined by measuring the deformation of the deformation element using strain gauges, preferably by measuring the individual normal strains of the strain gauges, and wherein four pairs of strain (Continued)

gauges assigned to each other are arranged at different angles, preferably +/−45, with respect to the pedal shaft.

21 Claims, 5 Drawing Sheets (51) Int. Cl.
    *A63B 24/00*     (2006.01)
    *B62M 3/08*     (2006.01)
    *B62M 6/50*     (2010.01)
    *G01L 3/10*     (2006.01)

(52) U.S. Cl.
    CPC .............. *G01L 3/108* (2013.01); *G01L 3/247* (2013.01); *A63B 2220/18* (2013.01); *A63B 2220/34* (2013.01); *A63B 2220/54* (2013.01); *A63B 2220/58* (2013.01); *A63B 2220/80* (2013.01); *A63B 2220/833* (2013.01); *B62K 2207/00* (2013.01)

(58) Field of Classification Search
    USPC .................. 73/379; 702/44, 187, 43, 42, 41
    See application file for complete search history.

(56) References Cited

U.S. PATENT DOCUMENTS

| | | | | |
|---|---|---|---|---|
| 5,257,540 | A * | 11/1993 | Bower et al. | 73/379.07 |
| 8,011,242 | B2 * | 9/2011 | O'Neill et al. | 73/379.01 |
| 8,327,723 | B2 | 12/2012 | Roudergues et al. | |
| 8,584,520 | B2 | 11/2013 | Kokkoneva et al. | |
| 8,584,529 | B2 * | 11/2013 | Fisher et al. | 73/782 |
| 2007/0068273 | A1 * | 3/2007 | Cunningham | G01L 3/247 73/781 |
| 2007/0137307 | A1 * | 6/2007 | Gruben | B62M 3/08 73/774 |
| 2010/0024590 | A1 * | 2/2010 | O'Neill | G01L 3/242 74/594.1 |
| 2012/0214646 | A1 * | 8/2012 | Lull et al. | 482/5 |
| 2012/0330572 | A1 * | 12/2012 | Longman | 702/44 |

FOREIGN PATENT DOCUMENTS

| | | | |
|---|---|---|---|
| DE | 4435174 A1 | 3/1996 | |
| DE | 4435174 C2 * | 8/2002 | .............. G01L 1/22 |
| DE | 102005027181 A1 | 12/2006 | |
| EP | 1661606 | 5/2006 | |
| WO | 2010109397 | 9/2010 | |
| WO | 2011138138 | 11/2011 | |
| WO | 2012059812 | 5/2012 | |

OTHER PUBLICATIONS

Patent Examination Report No. 1, Australian Patent Appln. No. 2010210239, dated Mar. 4, 2014.

Anonymous: "Picostrain", Jul. 5, 2007, XP002592877, retrieved from the Internet: URL:http://web.archive.org/web/20070705144255/www.acam-usa.com/Content/English/picostrain/ps.html.

* cited by examiner

APPARATUS FOR MEASURING AND DETERMINING THE FORCE, THE TORQUE AND THE POWER ON A CRANK, IN PARTICULAR THE PEDAL CRANK OF A BICYCLE

The invention relates to an apparatus for measuring and determining the force, the torque and the power on a crank, in particular the pedal crank of a bicycle, comprising an evaluation device, in particular a bicycle computer, and at least one pedal, wherein strain gages are attached on a deformation body in the pedal. The most accurate measuring results can be obtained with a left and a right pedal, however.

PRIOR ART

An apparatus is known from DE 37 22 728 C1, which detects the pedal forces on the bottom bracket by means of a suitable bending element onto which strain gages have been applied, converts them into an electrical signal and processes them in a microcomputer, in particular a bicycle computer, together with the angular speed of the crank, in order to calculate the resulting power. The strain gages are furthermore interconnected as a Wheatstone bridge. In this connection, because of structural measures, only the tangential fraction of the force, i.e. the torque on the crank, is detected. A component force in another direction, such as in a radial direction, will not be detected by the deformation element supporting the strain gages and can therefore not be measured. In this instance, the area of the bottom bracket serves as the summation point for the torques from the left and the right pedal crank. The force is supplied to the chainwheel via strain gages only from this point. The power can be calculated using the separately measured cadence. The disadvantage of this solution is that the force of both legs is always measured. Therefore no possibility is provided to optimize the cadence for the purpose of averaging the contribution provided by the individual legs. The accuracy is reduced because the moments carried via the strain gages contain the friction components from pedals and bottom bracket. Special measuring cranks are required, which must be compatible with the other bicycle equipment.

US 2007/0170688 A1 discloses an apparatus and a system for monitoring, analysis, and display of the force applied by the bicyclist onto the pedals during the ride. A measuring hub is provided for this purpose in the rear wheel, in which the moment which is generated from the chain traction force at the sprocket is discharged via a sleeve inside the hub body only on the other side of the hub. The torsional moment which is passed through, deforms the sleeve and is evaluated by strain gages. With the moment collected in this way and the separately measured angular speed, the power can be calculated. The disadvantage of this solution is also that the sum of the leg forces are measured in this way, and an exact evaluation of the contributions made by the individual legs is not possible. The accuracy of the introduced power is reduced by the chain efficiency as well as the pedal and bottom bracket friction variables. The power that was truly supplied is therefore larger than the measured power. Furthermore, a measuring hub must be laced into the rear wheel or a corresponding complete wheel be fitted into the wheel. The changeover between different bicycles is just as easy as retrofitting the wheel. The acquisition costs are relatively high because of the lacing that is required, as a minimum.

EP 0 909 940 A2 describes a method and an apparatus for measuring the power and for measuring the tensile force and the oscillation frequencies of an oscillating chain, e.g. of a bicycle chain. By making use of the principle of chord oscillation, it is shown that the upper strand of a chain which is subjected to tensile forces shows oscillation frequencies which are proportional to the tensile force, which can be measured by the retroactive effect of the oscillating chain onto the magnetic field of a sensor. If the chain weight per meter and the free chain length is known, the chain force can be determined and/or be back-calculated. The power on the chain can be determined together with a sensor for the chain velocity on the derailleur of a bicycle. A disadvantage of this solution is also that the sum force of both legs is measured, and an exact evaluation of the contributions made by the individual legs is not possible. From the comparison of the signal of the action of forces with the associated angle signal it can at best be identified whether the left or the right leg has the predominant power contribution at any given moment. A precise determination is not possible, because in the respective high-load phase of the one leg, the other leg also has a (positive or negative) share of the measured power. The accuracy is reduced by the efficiencies of the pedal, the bottom bracket, and the chain. Another disadvantage is that the back-calculation formula requires knowledge of the parameters of chain strand length (chainwheel to sprocket distance between centers), chain weight (a multiple of the weight of a chain link), and oscillation frequency.

By the dependency of the chain force from the variables such as chain weight, chain length, and oscillation frequency, this is generally subject to large errors, because in the worst case, the contributions made by the incorrect values determined are totaled according to the law of error propagation. Above all, a decisive influence is contributed by the chain weight, which fluctuates within the scope of the assumptions as to what part of a chain link can still be attributed to the weight of the strand. The magnetic field sensor must moreover be positioned carefully, because otherwise the frequency measurement is subject to large errors. This requires a very big effort for adjustment, overall.

EP 0 954 746 B1 describes a method for determining a body of revolution which can be rotationally driven about a rotational axis, in particular with respect to the torque exerted onto the bottom bracket shaft of a bicycle. In this context, a bottom bracket designed as a measuring unit is used, in which the force effect of the left leg results in the torsional deformation of the bottom bracket shaft. The left end of the bottom bracket shaft therefore advances in relation to the right end. The torsion angle and therefore the moment acting on the shaft are detected opto-electronically by means of scanning discs which are radially arranged there. To determine the introduced power, the shaft speed is determined via the pulse sequence of a scanning disk and is calculated against the moment. This unit is structurally compact. A disadvantage here is however that the power determined refers solely to the left leg. If the right leg is in the pressure phase, and the left leg provides only a small contribution, then the system can measure only a small deformation and thus only an apparent small power. On the other hand, the accuracy of the introduced power is reduced only by the single pedal and half the bottom bracket friction, as a result of which the system is quite accurate theoretically. For that reason, the actual power introduced is therefore only insignificantly greater than the measured power. Nonetheless, the contribution provided by the other leg must be assumed to be equivalent, if the power of the overall cadence is to be determined and calculated. The system furthermore needs optimal preparation of the bottom bracket thread, as well as an extremely careful assembly with respect to the tightening torque.

U.S. Pat. No. 7,377,180 B2 and U.S. Pat. No. 7,387,029 B2 describe measuring systems which do not measure the forces supplied, but instead the various rolling resistances to be overcome, the magnitude of which, according to Newton's third axiom, must be equivalent. The individual rolling resistances made up of incline, inertia, rolling and air resistance, are determined by means of appropriate sensors and are converted in the power equation. By detecting the acceleration above the ground and the overall acceleration, the angle of ascent can be determined. If the overall weight was measured, the acceleration resistance and the gradient resistance can be established therefrom. By measuring the dynamic flow pressure and by adding the environmental variables (air density from temperature), the air velocity is determined. If the air drag force coefficient is known, then the aerodynamic air resistance factor can be calculated from that. The air resistance factor for the typical driver attitude is determined by a calibration ride (coasting). The rolling resistance can also be determined from the calibration ride. These measuring systems have the disadvantage that only the overall power can be determined naturally, and that partitioning this into information about both legs is not possible in terms of measuring technology. Another disadvantage is moreover that the air resistance measurement is subject to significant disturbance variables (e.g. riding in the slipstream, crosswind), which affects accuracy negatively.

DE 44 35 174 C2 describes a device for measuring the force and power on a pedal crank, in particular that of a bicycle, in which the variables of force and angular speed are converted into electrical signals and are provided to an evaluation device. The forces are detected by means of a crank pin, which is screwed into the crank and is provided at the perimeter near the screw insertion point with strain gauges, wherein shear deformation can be measured by arranging them in pairs at 45°. From there, the effective shear force can be determined directly, without that moments from imperfect lever action, forces in the direction of the pedal shaft, or the load introduction point, play a role. A second component force can then also be measured by arranging the strain gauges in a plane offset by 90°. The crank angle position is determined by means of measuring the phase time of the cadence transmitter. The power can be calculated by measuring the cadence by means of a transmitter contact on the crank. With this configuration, the total force that is applied onto the pedal, with the associated angle, can be determined. A resolution of forces of the radial and tangential components relative to the crank is possible. Because the angle position of the strain gages relative to the crank cannot be adjusted, the screw-in angle must be performed by a calibration measurement with a perpendicular effective force in a known angle position (direction of force calibration), or by a direct measurement of the angle with manual input (position angle measurement of the axis). Although this solution permits the forces acting on the left and the right pedal to be determined separately, to gain further information, such as axial forces or torsional moments acting on the axis, is not possible by using this measuring system and this measuring configuration. Any further information desired would require additional cabling in the form of a Wheatstone bridge, which would not be useful from a practical point of view.

The disadvantage of the majority of these measuring systems is that the distribution of power cannot be measured for both legs separately and/or that not all of the effective forces can be measured.

OBJECT OF THE INVENTION

The object of the present invention is to design a measuring system that can be installed easily and which is in the position to determine the power distribution for both legs separately, split-up tangentially and radially relative to the crank, as a function of the crank angle. Moreover, any other force effects, such as the resultant from the pedal force, its effective angle/s as well as the axial force or the torsional moments with respect to the pedal shaft, should be able to be determined separately for both legs. The objective is to be able to determine the delivered power for both legs separately as well as the total power output of both legs.

Solution

The problem according to the present invention is solved in that the force variable is determined by measuring the deformation of a deformation body, which is rotatably mounted on the pedal shaft and within the pedal body and on which the four pairs of reciprocally arranged strain gages are arranged at a different angle, in particular by the measurement of the individual normal strains of the strain gages. The flux of force from the pedal body via the joint to the deformation body up to the thread of the pedal shaft occurs completely via these strain gages.

Achieved Benefits

The measuring system consists only of three and/or four assemblies, one pedal or two pedals, a speedometer, and an evaluation unit, such as a bicycle computer. Any further cabling and additional sensors, such as crank angle sensors on other measuring systems, are not required. Clips and cable straps can also be omitted. The measuring system can detect the horizontal, vertical, and axial force variables on the pedal, loss moment of the pedal bearing, the crank angle, the pedal inclination angle, and the ascent angle of the road surface, without having any disadvantages such as those of the prior art. By using the measured data, the following main information mentioned can be obtained, for which there was no previous solution available, in particular for mobile applications, either generally or in this particular circumstance of information content, installation space, integrity and precision based upon this principle.

1. Crank angle/s and any chronological conclusions therefrom, such as angular velocity
2. Power distribution for both legs separately, split-up tangentially and radially relative to the crank, determined as a function of the crank angle, as well as any force effects, such as pedal force resultants and their effective angle/s
3. Axial force with respect to the pedal shaft for both legs separately
4. Pedal bearing losses for both sides separately
5. Power output for both legs separately
6. Total power output for both legs Using the data obtained about tangential, radial, and axial force and the pedal inclination angle, it will for the first time be possible to generate additional other information, in particular such regarding the topic of sprint performance and sprint quality.

A significant feature of the invention is the application of the strain gages for the measurement of the individual normal strains on a deformation body, because, amongst other things, the disadvantage of having to attach the strain gages on the pedal shaft and therefore the problem as how to provide contact to the readout and processing unit across the screw insertion point, is avoided. Since the deformation body is stationary in relation to the pedal body, the leads to the readout and processing unit in the pedal body can be short, wherein any influences of disturbance variables can be avoided. Because of the rotational symmetry of the deformation body, the quality of the deformation measurements and with respect to the shear force components is naturally uniformly good.

A further advantage is considered to be the fact that the system can also be operated using only one pedal for measurement, wherein the received values of a pedal determined can then be transmitted partitioned symmetrically, such as to the evaluation unit, in particular the bicycle computer.

In an advantageous embodiment, the evaluation of the strain gages are evaluated by a Resistor-to-Digital-Converter (RDC) instead of by means of a Wheatstone bridge, translated: Resistor-to-Digital-Converter, and/or a Time-to-Digital-Converter (TDC), which represent a particularly space-effective and energy-efficient variant of signal recovery. RDC circuits determine the individual strains of strain gages via the determination of a time ratio, and not like Wheatstone bridges which detect the desired force from the stress ratio U/Us (U=bridge voltage, Us=supply voltage) directly by the measuring process, and forward these to an analog-to-Digital converter (ADC) for digitalization. With RDC circuits, the required algebraic relationship required for the force of interest is then obtained from a subsequent calculation, such as from a microcontroller. No additional circuits are required. The RDC circuits connect the strain gages in a resonant circuit (RC element), the discharge time of which is measured by the RDC, and which is a measure for the electrical resistance of the strain gauge in the RC element. When this is performed for two strain gages, then a time ratio v can be defined, with which the measurement of resistance is ascribed to the measurement of time. The time measurement can be done extremely precisely (within the picoseconds range) and on the other hand means that no energy has to be used for preparing the primary variable of "resistance." The space and energy efficiency can be increased by a further variant of an RDC module, which contains at least four RDC channels as well as a microcontroller which also facilitates the further digital processing, calculations and signal transmission. Whether integrated or connected downstream of the RDC, the calculation of the derived data can already be performed in the pedal, which reduces energy consumption for the evaluation unit and/or the bicycle computer.

In a further advantageous embodiment, all measurement data can be transmitted wireless to the evaluation unit 17.

Figure 5:
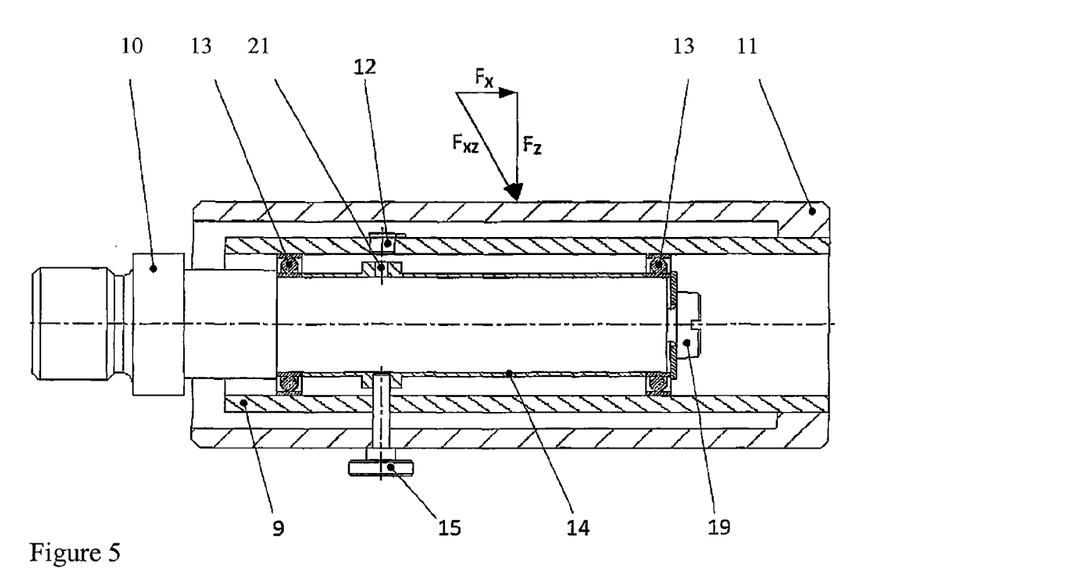
FIG. 5 is a cross-section through the pedal 16, consisting of a pedal body 11, a deformation body 9, a trigger element 14, a pedal shaft 10, two bearings 13, and an angle sensor 12

FIG. 5 shows a pedal 16 comprising a pedal body 11, a deformation body 9, a trigger element 14, a pedal shaft 10, two bearings 13, a locking screw 19, and an angle sensor 12. The left and the right pedal 16 are constructed identically. For this reason, only one pedal is described in terms of measuring technology and structural design. The deformation body 9 is rotatably pivoted on two positions on the pedal shaft 10. The strain gages 1-8 are applied on the cantilevered sections which connects the deformation body 9 with the pedal body 11. The flux of force from the pedal body 11 via the joint to the deformation body 9 up to the thread of the pedal shaft 10, i.e. all effective forces and moments acting on the pedal body 11, occurs non-branched and completely via the strain gages.

Four pairs of assigned strain gages 1-8 at an orientation angle of ±45° to the pedal shaft 10 are used, of which respectively two pairs each are reciprocally opposed on the periphery of the deformation body 9. Two reciprocally opposed pairs serve for the determination of the shear force component perpendicular to the plane which connects the pairs, and because the strain gauge pairs are applied reciprocally in two vertical planes, one of which is the tread plate plane, the vertical and horizontal components on the tread plate of the pedal body 11 can be determined in this manner. In this connection, the selection of a position angle of +45° in relation to the pedal shaft produces the biggest strain signals, which is desirable for the purpose of maximum resolution. This configuration has the known advantage that bending moments acting upon the deformation body 9, irrespective of their origin, by forming the average value of the resulting tensile and compressive stress within the strain gages resulting therefrom, have the tendency to let the bending moments disappear.

Figure 6:
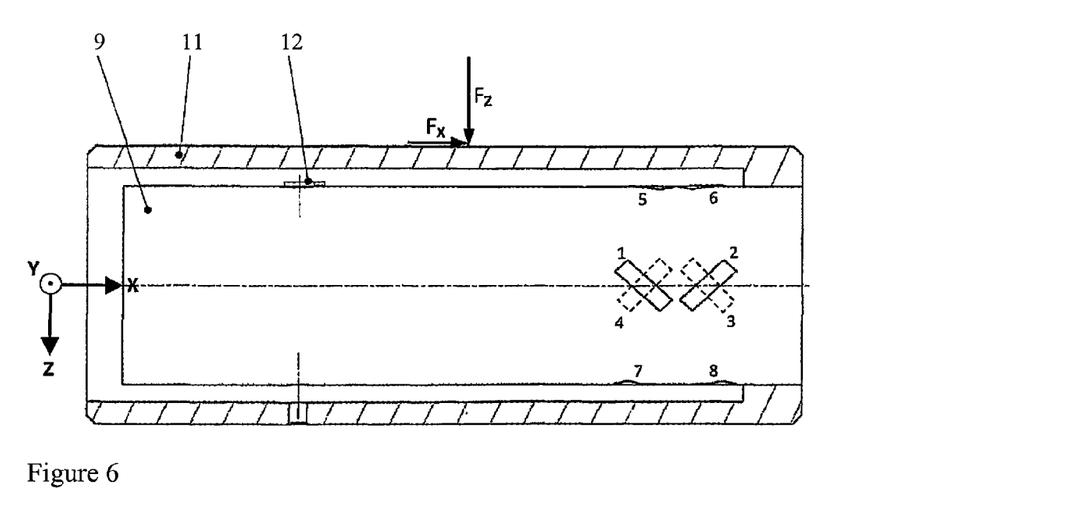
FIG. 6 is a cross-section (front elevation) through the pedal body 11 by representing the configuration of the strain gages on the deformation body 9

Particularly the x-shaped configuration of the reciprocally opposed strain gauge pairs 1-4, see FIG. 6, offers the possibility to also be able to separate the axial force and the loss moment on the pedal shaft 10, with suitable algebraic linkage beyond the measured strains across the said shear force components (vertically and horizontally).

Figure 9:
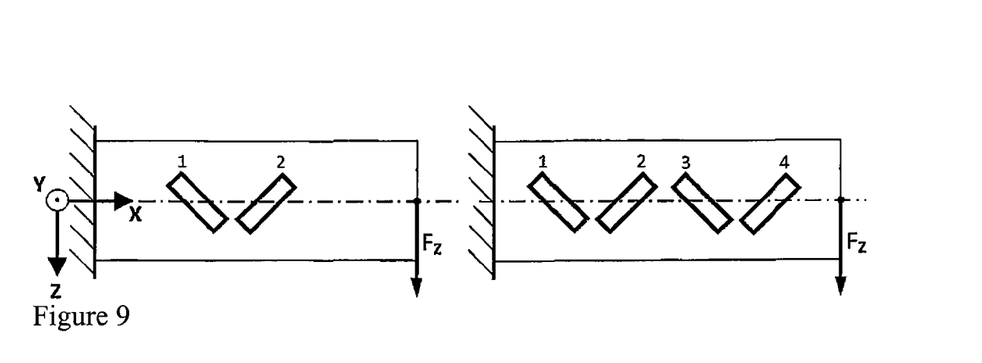
FIG. 9 is the single V and the double V configuration of the strain gages In the following, an embodiment of the invention is described in detail by means of the drawings.

For the straight determination of shear force, also one-sided applied single v or also double v configurations are suitable, for example. This is shown and represented in FIG. 9.

Figure 2:
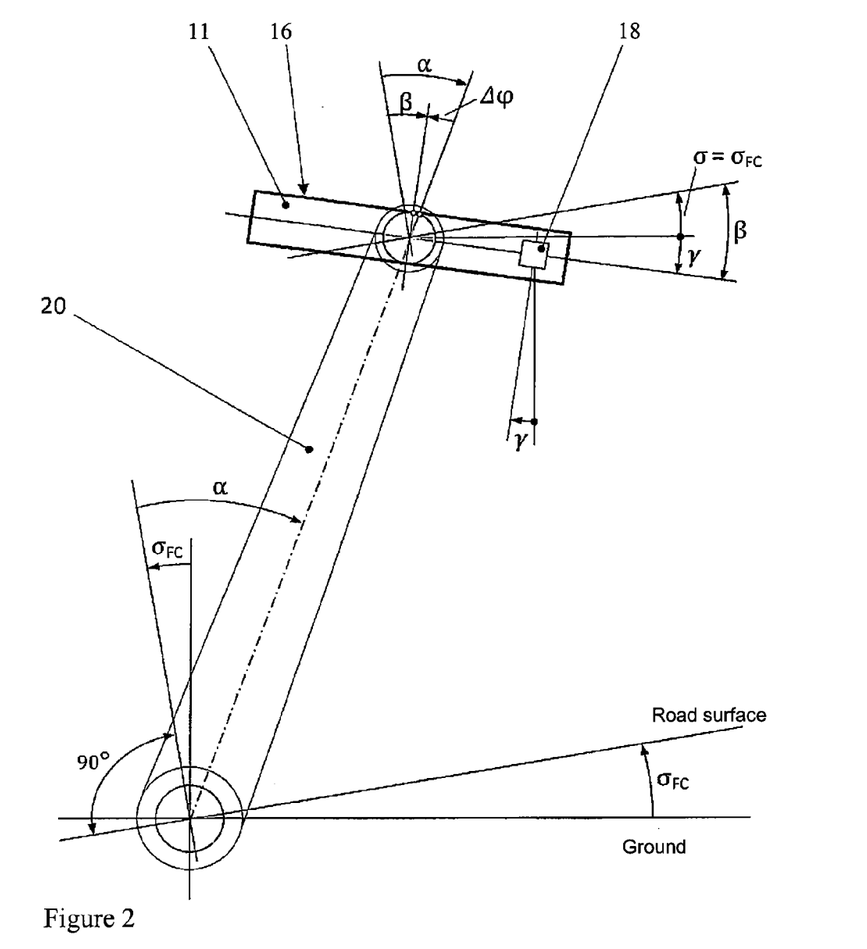
FIG. 2 is a side elevation of the crank 20 with the pedal 16, representing the angle positions in dependence of the ground and the road surface
Figure 3:
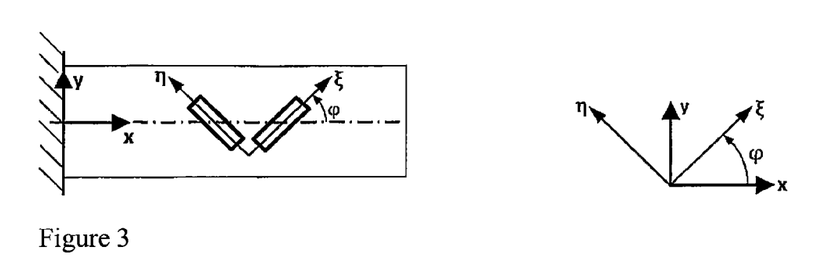
FIG. 3 is a coordinate transformation regarding the configuration of the strain gages

The back calculation of the distortions from $\epsilon_x, \epsilon_y, \gamma_{xy}$ from strains $\epsilon_\xi, \epsilon_\eta$ which were measured below 45° to the pedal shaft 10, results from the coordinate transformation of the reciprocally rotated coordinate systems (see FIG. 2):

$$D^{\xi\eta} = T \cdot D^{xy} \cdot T^T \text{ in which is}$$

$$D^{xy} = \begin{bmatrix} \varepsilon_x & 1/2\gamma_{xy} \\ 1/2\gamma_{xy} & \varepsilon_y \end{bmatrix}$$

$$D^{\xi\eta} = \begin{bmatrix} \varepsilon_\xi & 1/2\gamma_{\xi\eta} \\ 1/2\gamma_{\xi\eta} & \varepsilon_\eta \end{bmatrix}$$

-continued $$T = \begin{bmatrix} \cos\varphi & \sin\varphi \\ -\sin\varphi & \cos\varphi \end{bmatrix}$$

$D^{xy}$: is a distortion tensor in the x, y coordinate system
$D^{\xi\eta}$: is a distortion tensor in the $\xi,\eta$ coordinate system
T: is the rotation matrix (transformation matrix)
$T^T$: is the transposed rotation matrix The strain components of interest of $D^{\xi\eta}$ when written out, are for $\phi=45°$:

$\epsilon_\xi=\frac{1}{2}(\epsilon_x+\epsilon_y)+\frac{1}{2}\gamma_{xy}$ and $\epsilon_\eta=\frac{1}{2}(\epsilon_x+\epsilon_y)-\frac{1}{2}\gamma_{xy}$.

These correlations must be addressed for each strain gauge 1-8 applied, noting any signs of distortions, i.e. which direction the distortions $\epsilon_x,\epsilon_y,\gamma_{xy}$ assumes by means of the sought-for loads (shear force, axial force, loss moment). The shear distortion $y_{xy}$, as a result of shear force and torsional moment, is composed of $Y_{xy}^F$ and $Y_{xy}^M$.

The normal strain $\epsilon_x$ is made up of the axial force and the bending moment percentages $\epsilon_x^{Fx}$ and $\epsilon_x^{Fy}$ together, the second of which disappears as a result of averaging within the strain gages 1-8. In addition, for a purely axial load in the X direction, $\epsilon_x+\epsilon_y=\epsilon_x-v\cdot\epsilon_x$ is applicable.

Figure 8:
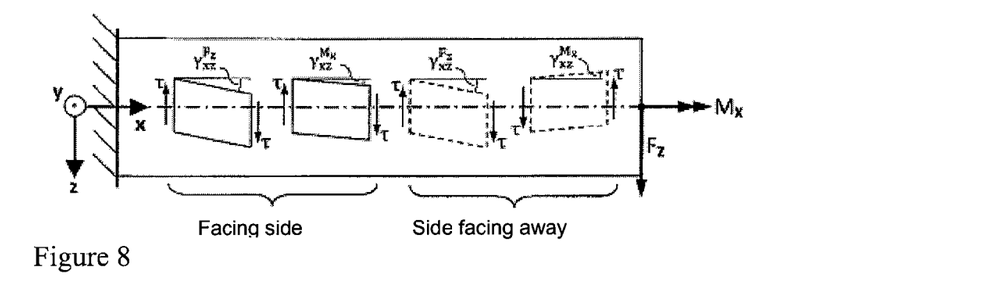
FIG. 8 are the signs of the shear distortion on the facing side as well as on the side facing away, as a result of loads $F_z$ and $M_x$ in the direction of the positive coordinates

The transfer to the coordinate system of the strain gages 1-8 from FIG. 6 results by taking into account the signs of the distortions as a result of $F_z$ and $M_x$ from FIG. 8 and $F_x$ from FIG. 6 for the strain gauge 1, for example:

$$\varepsilon_1 = \varepsilon'_\xi = \frac{1-v}{2}\varepsilon_x^{Fx} + 1/2(\gamma_{xz}^{Fz} + \gamma_{xz}^{Mx})$$

$\epsilon_x^{Fx}$: =>strain as a result of axial force $F_x$ (strain from bending moment $M_y$ averages to zero)
$\gamma_{xz}^{Fz}$: =>shear as a result of shear force $F_z$
$\gamma_{xz}^{Mx}$: =>shear as a result of torsional moment $M_x$, ("loss" moment)
v: =>Poisson ratio If this is performed for the strain gages 1-4, then the following information can be gained (analogously for the strain gages 5-8):

$\epsilon_1-\epsilon_2+\epsilon_3-\epsilon_4=2\gamma_{xz}^{Fz}$=>shear force $F_z$ $\epsilon_1-\epsilon_2+\epsilon_4-\epsilon_3=2\gamma_{xz}^{Mx}$=>loss moment $M_x$ $\epsilon_1+\epsilon_2+\epsilon_3+\epsilon_4=2(1-v)\epsilon_x^{Fx}$=>axial force $F_x$ $\epsilon_5-\epsilon_6+\epsilon_7-\epsilon_8=2\gamma_{xy}^{Fy}$=>shear force $F_y$ These four equations are the actual characteristics of the invention for the evaluation of the strain gages, because they show that the simple algebraic relationship of the individual normal strains provides all four sought-for variables. While a Wheatstone circuit according to the prior art with the strain gages 1-4 can determine only the first variable ($F_z$), the first three variables from the strain gages 1-4 can be determined with only one RDC circuit. This is considered to be a particular advantage.

The calculation of the force effects from the distortions is done using the law of elasticity:

$F_x=E\cdot A\cdot s_x$, $F_z=G\cdot A_S\cdot\gamma_{xz}^{Fz}$, $F_y=G\cdot A_S\cdot\gamma_{xy}^{Fy}$
$M_x=G\cdot W_x\cdot\gamma_{xz}^{Mx}$ Here, A, $A_S$ and $W_x$ are the stress-defining cross-sectional variables.

Figure 7:
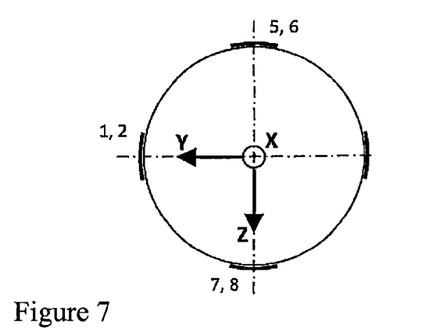
FIG. 7 is a cross-section (side elevation) through the pedal body 11 by representing the configuration of the strain gages on the deformation body 9

After the strain gages 1-8 have been applied, the deformation body 9 can be uniquely positioned mechanically in the pedal body 11, by an indexing pin 15, for example, which is inserted through a sufficiently precise bore in the pedal body 11 and in the deformation body 9. Therefore it is ensured that the x,y-plane mounted from the strain gages 1-4 is positioned exactly parallel in relation to the tread plate plane (see FIGS. 6 and 7), as a consequence of which no further force calibrations will be required.

In an alternative option for a Wheatstone circuit, the arrangement produces the biggest signals below ±45°, which is important for the use of so-called Resistor-to-Digital-Converters (RDC), because no stress signals must be evaluated.

The trigger element 14 which is needed for detecting the relative angle between the pedal body 10 and the crank 20 is designed as a sleeve in FIG. 5, which supports two trigger points in the form of radial bores provided at 180° spacing on a raised annulus. Therefore two impulses per revolution are given. The zero trigger of the trigger element 14 will here be designed particularly by a bore of a varying diameter. By a relative rotation of the pedal shaft 10, the trigger points sweep past the relative angle sensor 12 and will be detected as a result; for that purpose, the relative angle sensor 12 is fixed at a suitable distance to the trigger annulus in the deformation body 9.

To establish the zero point of the trigger element 14 in relation to the crank 20, the trigger element 14 must be mechanically aligned to any optional position of the crank 20, such as when this points perpendicular to the top. The selected position is advantageously programmed permanently in the bicycle computer 17. As a result, after arranging the crank 20 in this position and having adjusted the zero trigger relative to it, the bicycle computer 17 requires no further input.

The mechanical adjustment to crank zero is performed in a first step, in that the indexing pin 15 is inserted through the pedal body 11 and the deformation body 9 until touching the trigger annulus, and in that the pedal shaft 10 together with the trigger element 14 is subsequently turned into the "push-through position." The indexing pin 15 can now be completely inserted as shown in FIG. 5 and must be fixed. Because of the different bore diameters, any mix-up with the bore of the zero point trigger 21 is therefore impossible. The second step comprises loosening the trigger element 14 by means of the indicated positioning screw 19. If the crank 20 is in its defined zero position and the pedal 16 is screwed-in, the tread plate plane of the pedal body 11 can be turned into a horizontal position, for example, which means that the loosened trigger element 14 co-rotates. The positioning screw 19 must subsequently be re-tightened, the indexing pin must be removed, which means that the adjustment is finalized. This adjustment will be retained until the arrangement needs to be taken apart, i.e. even if the pedal is screwed-off and screwed-on again temporarily, the adjustment will not change.

The swept relative angle $\Delta\phi(t)$ between the crank 20 and the pedal body 11, measured from the zero point trigger 21 can be calculated from the angular speed $\omega_{i-1}=\Delta\phi_{i-1}/\Delta t_{i-1}$ of the preceding trigger segment and the transit time $\Delta t=t-t_{i-1}$ since the last trigger point, on the assumption that the angular speed and the current angle segment has not changed compared to the preceding one, to:

$$\Delta\varphi(t) = (t-t_{i-1})^0 \cdot \Delta\varphi_{i-1} + \omega_{i-1}\cdot(t-t_{i-1}) \text{ where}$$

$$(t-t_{i-1})^0 = \begin{cases} 0, & t \le t_{i-1} \\ (t-t_{i-1})^0 = 1, & t > t_{i-1} \end{cases}$$

$\Delta\phi_{i-1}$ 180° for the trigger element 14 with two equidistant trigger points $\Delta t_{i-1}$ transit time between the preceding triggers With each pass of the zero point trigger 21, the time is recorded anew. For additional information, the relative angle sensor 12 can provide the cadence $n_{i-1}$ from the angular speed $\omega_{i-1} = 2\cdot\pi\cdot n_{i-1}$.

The relative angle $\Delta\phi(t)$ determined between the pedal body 11 and the crank 20 alone is not sufficient to be able to calculate the characteristics of forces, moment, or the power via the crank angle. In order to be able of not having to use any external crank angle sensors because of the additional components required, the crank angle information can be determined by calculation from the relative angle $\Delta\phi(t)$, the pedal inclination $\gamma$, and the incline of the road surface $\sigma_{FC}$. For this purpose, the inclination angle sensor 18 is integrated in the pedal 16 in the present embodiment, which measures the pedal inclination $\gamma$ in relation to the ground surface. But because the signal also contains the incline of the road surface $\sigma_{FC}$, an inclination angle sensor of the same type must be attached stationary (e.g. integrated in the bicycle computer 17), to measure the current incline separately and from which it is corrected by means of the microcontrollers, e.g. in the bicycle computer.

The following circumstances refer to FIG. 2 (positive angles, turning clockwise):

The following is applicable for the pedal body 11: $\beta-\Delta\phi$ $\beta$ = tilting angle of the pedal body 11 measured relative to the road surface and $\beta = \gamma - \sigma$ results in the following: $\alpha = \gamma - \sigma_{FC} - \Delta\phi$; $\sigma = \sigma_{PR} = \sigma_{FC}$ und $\Delta\phi = \Delta\phi(t)$ Because of the positive direction of rotation for $\alpha$, the following applies:

$\sigma = \sigma_{FC} < 0$ with a positive incline of the road surface and $\Delta\phi < 0$ the pedal body rotates in reverse in relation to a forward motion of the crank ($\alpha > 0$)

In this context, $\alpha$ is the crank angle, $\sigma_{FC}$ is the incline of the road surface measured at the bicycle computer 17, $\gamma$ is the pedal inclination measured at the pedal 16. $\Delta\phi = \beta - \alpha$ is the relative angle measured in pedal 16. In order to be able to use $\sigma_{FC}$ as a correction quantity on the bicycle computer 17, an offset determination of the installation position of the bicycle computer 17 is required.

Figure 4:
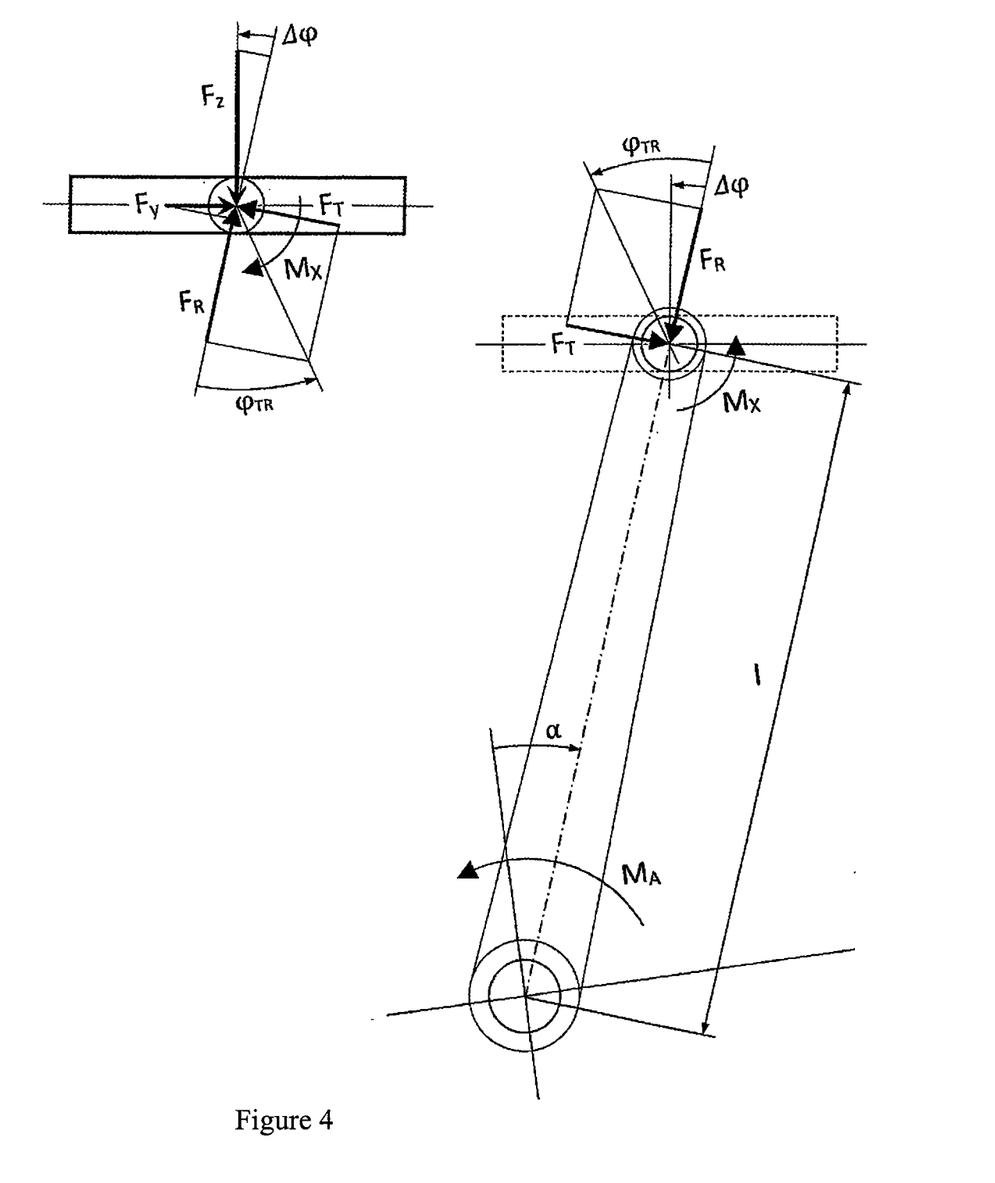
FIG. 4 is a side elevation of the crank 20 with the pedal 16 by representing the effective crank forces

The drive torque $M_A$ which is relevant for propulsion is derived from the equilibrium on the crank 20 (see FIG. 4) in relation to:

$M_A = F_T \cdot 1 - M_x$; $M_x$: loss moment on the pedal bearing and equilibrium of forces on pedal 16 (see FIG. 4) produces:

$F_T = F_z \cdot \sin\Delta\phi + F_y \cdot \cos\Delta\phi$; $F_T$: tangential force on the crank 20

$F_R = F_z \cdot \cos\Delta\phi - F_y \cdot \sin\Delta\phi$; $F_R$: radial force on the crank 20

The relative angle $\Delta\phi$ between crank 20 and pedal 16 is measured directly. As a result of the angular relationships described above, the force characteristics about the crank angle $\alpha$ are also available.

If required, the resultant $F_{TR}$ and its effective angles $\phi_{TR}$ are derived from (FIG. 4).

$F_{TR} = \sqrt{F_T^2 + F_R^2}$ and $\tan\phi_{TR} = F_T/F_R$

Figure 1:
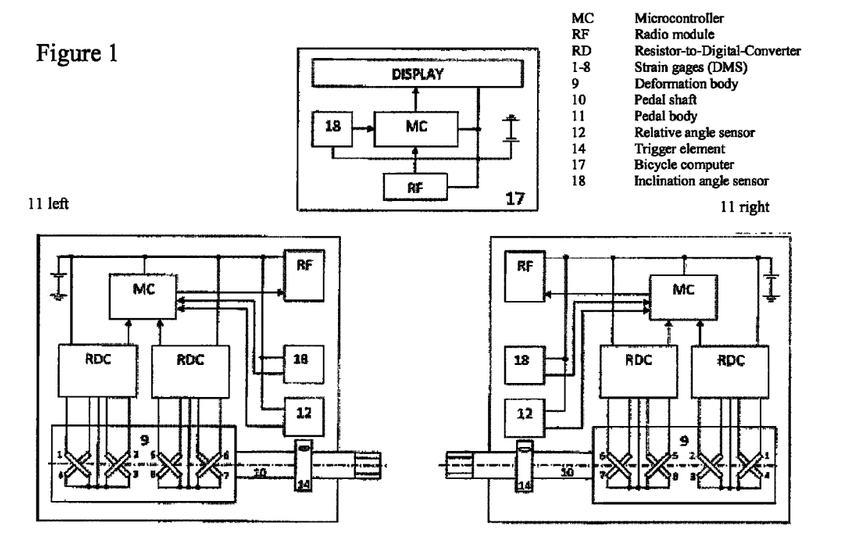
FIG. 1 is a system diagram with a bicycle computer (FC) as evaluation unit 17 and a left and a right pedal, where a resistor-to-digital converter (RDC) is arranged after the strain gauge

FIG. 1 shows a system diagram of the embodiment of the signal recovery and signal processing for both pedals. Here, the left and the right are constructed identically. On the bicycle computer 17, only one measuring pedal can be operated, as a low-cost variant, for example. The strain measurement is illustrated by means of two RDCs, the digitalized signals of which are combined with the signals of the relative angle sensor 12 and the inclination angle sensor 18 (NW) in a separate microcontroller (MC), are pre-processed and transmitted to the bicycle computer (FC) via the RF module (RF) using a highly energy-saving, digital transmission protocol.

The strain gages 1-8 are not externally connected into the bridge circuit, but can be individually measured by the RDC, which makes it possible, as shown by the four equations above, that all shear forces of interest, the axial force, and the loss moment on the pedal shaft 10, can be determined by simple algebraic linkage of the strain information in the microcontroller (MC). The measurement of the shear forces of one plane (e.g. vertical) is performed by one of each set of strain gages (comprising two strain gage pairs), e.g. set 1-4; the strain gage set 5-8 measures the horizontal component. For determining the axial force and moment information, only one of the two strain gage sets needs to be associated. An embodiment is also possible in which, by leaving out the axial force and loss moment information, a single RDC is sufficient.

The bicycle computer 17 then takes over the correction of the road surface ascent through its inherent inclination angle (NW), to make it possible to later represent crank angle related characteristics correctly, performs all contemplated calculations, stores the determined data and displays selected data, such as the current overall power, power and/or force balances left/right, etc. If any further evaluations are envisaged on the PC, the RF transmits the data to a PC interface.

The invention claimed is:

1. An apparatus for measuring and determining the force, the torque and the power on the pedal shaft of a bicycle, wherein the pedal shaft extends along a pedal shaft axis, comprising:
   at least one pedal having a pedal body;
   a deformation body contained within the pedal body, wherein the deformation body is stationarily connected to the pedal body at a first location and is rotatably supported by the pedal shaft at a second location spaced from the first location, wherein the deformation body includes a cantilevered section that extends between the first and second locations and wherein the deformation body connects the deformation body to the pedal body at the second location, wherein pedaling forces applied to the pedal body by a user are transferred from the pedal body through the cantilevered section of the deformation body to the pedal shaft;
   an angle sensor associated with the deformation body, wherein the angle sensor measures an angle of orientation of the deformation body relative to the pedal axis; and
   a strain sensing arrangement on the cantilevered section of the deformation body for measuring strain experienced by the cantilevered section of the deformation body due to forces applied to the pedal.

2. Apparatus according to claim 1, further comprising a bicycle computer and a signal transmission arrangement for transmitting signals to the bicycle computer from the strain sensing arrangement.

3. Apparatus according to claim 2, wherein the pedal and the bicycle computer each has an inclination angle sensor.

4. Apparatus according to claim 1, wherein a force variable from the strain sensing arrangement is converted into electrical signals by means of Resistor-to-Digital-Converters (RDC).

5. Apparatus according to claim 2, wherein pedal force characteristics are determined by the bicycle computer by means of the angle of a pedal crank to which the pedal shaft is mounted.

6. Apparatus according to claim 2, wherein the signal transmission, arrangement comprises a wireless signal transmission arrangement by which signals are transmitted to the bicycle computer.

7. Apparatus according to claim 1, wherein torsional moments, such as the loss moments due to friction, are determined on the pedal shaft via the pedal.

8. Apparatus according to the claim 2, wherein the signal transmission arrangement transmits signals relating to force components from the pedal to the bicycle computer, wherein riding styles such as out of saddle pedaling, sprinting, or downhill riding can be identified and be compared against riding styles stored in the bicycle computer.

9. Apparatus according to claim 2, wherein the bicycle computer determines the inclination of a road surface for recalibrating data corresponding to signals transmitted by the signal transmission arrangement.

10. Apparatus according to claim 1, wherein the pedal has a mechanically adjustable zero point position for the angle.

11. Apparatus according to claim 10, further comprising an adjusting tool for adjusting the zero point position for the angle, and wherein the adjusting tool is also a transport locking device for the pedal.

12. Apparatus according to claim 2, wherein data corresponding to signals transmitted by the signal transmission arrangement are retrieved from a left and a right pedal of the bicycle.

13. Apparatus according to claim 12, wherein the bicycle computer evaluates, compares and displays power separately from the left and the right pedals.

14. Apparatus according to claim 1, wherein the strain sensing arrangement on the deformation body of the pedal comprises two pairs of strain gages to determine vertical and horizontal components of a force applied to the pedal.

15. Apparatus according to claim 1, further comprising a pedal crank to which the pedal shaft is mounted, and wherein an angle of the pedal crank and an angle speed of the pedal crank are determined from a pedal-periodic and terrestrial signal.

16. Apparatus according to claim 1, wherein a determination of forces on the pedal in three spatial directions and a loss moment due to friction are performed via linking of strains on the deformation body.

17. Apparatus according to claim 16 wherein a measurement of normal strains on the deformation body is performed by means of pairs of strain gages applied on the deformation body less than 45° in relation to the pedal shaft axis in two directions placed perpendicular on top of each other.

18. Apparatus according to claim 1, further comprising a pedal crank to which the pedal shaft is mounted, and wherein a relative angle between the crank and the pedal body is determined from a transit time signal.

19. Apparatus according to claim 1, further comprising a pedal crank to which the pedal shaft is mounted, and wherein a radial and a tangential component of a force on the crank and a resulting force with an effective angle is determined by means of pedal force characteristics.

20. Apparatus according to claim 1, further comprising a pedal crank to which the pedal shaft is mounted, and wherein the pedal links the accuracy of a relative angle between the crank and the pedal body with a number of trigger points.

21. Apparatus according to claim 1, wherein an axial force and a loss moment due to friction are determined with two pairs of strain gages on the deformation body.

* * * * *